United States Patent
Nadezhdin et al.

(10) Patent No.: US 6,852,386 B2
(45) Date of Patent: Feb. 8, 2005

(54) COMPOSITE BOARD WITH OSB FACES

(75) Inventors: Alex Nadezhdin, Beaconsfield (CA); Wallace S. Pettersen, Hagley, MN (US); Maurice Poirier, LaSarre (CA)

(73) Assignee: Norbord Inc., Toronto (CA)

( * ) Notice: Subject to any disclaimer, the term of this patent is extended or adjusted under 35 U.S.C. 154(b) by 0 days.

(21) Appl. No.: 09/800,826

(22) Filed: Mar. 8, 2001

(65) Prior Publication Data

US 2002/0176960 A1 Nov. 28, 2002

(51) Int. Cl.$^7$ ............................................... B32B 5/12
(52) U.S. Cl. ........................ 428/138; 428/116; 428/323
(58) Field of Search ........................... 428/116, 117, 428/118, 131, 134, 137, 138, 304.4, 309.9, 323, 903.3

(56) References Cited

U.S. PATENT DOCUMENTS

| | | | |
|---|---|---|---|
| 3,650,871 A | 3/1972 | Bentfors | 156/269 |
| 3,664,076 A | 5/1972 | McCoy | 52/264 |
| 3,671,615 A | 6/1972 | Price | 264/39 |
| 3,718,536 A | 2/1973 | Downs et al. | 161/168 |
| 3,815,215 A * | 6/1974 | Medawar | 29/460 |
| 3,895,997 A * | 7/1975 | Haywood | 162/100 |
| 4,045,603 A | 8/1977 | Smith | 428/2 |
| 4,111,730 A | 9/1978 | Balatinecz | 156/62.2 |
| 4,382,108 A | 5/1983 | Carroll et al. | 428/326 |
| 4,709,781 A | 12/1987 | Scherzer | 181/290 |
| 5,011,741 A | 4/1991 | Hoffman | 428/503.1 |
| 5,209,968 A | 5/1993 | Sweeney | 428/312.4 |
| 5,224,315 A * | 7/1993 | Winter, IV | 52/309.8 |
| 5,611,882 A | 3/1997 | Riebel et al. | 156/272.2 |
| 5,729,936 A | 3/1998 | Maxwell | 52/220.2 |
| 6,173,540 B1 * | 1/2001 | Spivey | 52/191 |

* cited by examiner

Primary Examiner—Harold Pyon
Assistant Examiner—Alicia Chevalier

(57) ABSTRACT

A method and structure is disclosed for oriented strand boards that utilize a 3-layer, sandwich-type structural panel. The two outer faces are preferably made of wood flakes and the inner core preferably is made out of compression resistant products such as wood chips, paper mill sludge or recycled paper. The core is either a continuous perforated mat or a plurality of individual chunks of compression resistant materials, and preferably contains voids to provide for a reduction in weight of the board.

24 Claims, 1 Drawing Sheet

COMPOSITE BOARD WITH OSB FACES

BACKGROUND OF THE INVENTION

1. Field of Invention

The present invention is directed to oriented strand board (OSB) technology and, more particularly, to a structural panel with OSB faces and a core inside that is lightweight, strong, and a product of recycled (or other low cost) materials. The present invention also relates to a method of manufacturing such a composite board.

2. Description of the Related Art

The oriented strand board (OSB) has recently become a preferred product for structural wall sheathing. It is made by consolidating, under high pressure and temperature conditions, a thick mat of essentially flat wood flakes (otherwise called wafers) mixed with a small quantity (preferably between 2% and 6%) of a thermoset resin binder (usually of phenol formaldehyde or polyisocianate type). The mat is laid out in several layers on a continuous conveyor, so that each subsequent layer has a different preferred orientation of wood flakes. Larger flakes are usually reserved for faces on both sides, while smaller ones are placed in the middle layer (designated as the core).

The process of consolidating the OSB is made in one pressing step. This is in contrast to plywood (the more expensive predecessor of OSB) which is made by laminating together flat veneer sheets with a thermoset resin in between. It is believed that the required strength characteristics, such as modulus of elasticity (MOE) and the modulus of rupture (MOR), are mostly determined by the strength and integrity of the outmost layers in OSB panel, (i.e. the face). Although the core contributes to performance, its main purpose is to provide resistance to compression during the manufacturing press cycle. In particular, proper resistance to compression allows for effective face consolidation during the squeezing between the hot metal plate of the press and the densified core.

On the other hand, the dense core contributes to panel weight and consumes wood, a valuable resource. Replacing the conventional core with different materials, especially the products of recycling, has been and remains an attractive alternative for the industry and society as a whole.

Incorporating recycled plastics, paper waste and other comminuted materials into the core of a structural panel has been described in patent literature since 1972. For example, U.S. Pat. No. 3,650,871 (incorporated herein by reference) aims at producing a continuous mat by filling voids in the pre-fabricated honeycomb network with filler material for subsequent consolidation into a solid insulating board, to be further reinforced by pre-fabricated flexible covers on both sides, which are attached in a separate assembly step. However, the intentional filling of void space adds weight, and the manufacturing process for producing such a board requires more than one step.

Another example is described in U.S. Pat. No. 3,664,076 (incorporated herein by reference), which describes a product prototype that is a thick, but light structure, made from torn and randomly oriented waste paper pieces. It is made rigid by impregnating the paper pieces with resin, and subsequently bonding them to adjacent surface skins. However, to allow for sufficient rigidity and resistance to compression, significant amounts of resin are required. In addition, the only way an OSB face could be part of the proposed structure would be by conventional lamination of pre-fabricated faces and cores.

The manufacture of particle boards or variable shaped molded materials using paper waste is disclosed in U.S. Pat. No. 4,111,730 (describing an essentially homogeneous particleboard, made by using a conventional OSB production process, where thin wood wafers are replaced with pieces of recycled paper), and in U.S. Pat. No. 5,215,625 (utilizing complex recycling of paper, paint, and ink waste in the form of a moldable semi-liquid paste, which is subsequently placed in a mold and the residual solvent mixture is dried off). These two patents are incorporated herein by reference.

U.S. Pat. Nos. 3,671,615; 3,718,536; and 4,045,603 (all incorporated herein by reference) disclose technology for producing fiber reinforced thermoplastic boards. However, the produced structures are essentially homogeneous and usually very dense. In addition, both the manufacturing processes and the board properties are quite different from structural board manufacturing, which relies on thermoset resin technology and ordinarily delivers higher strength (especially at elevated temperature).

Still more examples of using recycled materials include U.S. Pat. No. 4,709,781 (describing multi-layer board made of metal sheets and comminuted scrap rubber tires), U.S. Pat. No. 5,011,741 (describing a multiple liner board bonded with starch), U.S. Pat. No. 5,209,968 (describing a plastic core between cellulosic covers, which is monolithically formed by using cementitious binder slurry, e.g., Portland cement, which is formed and cured), U.S. Pat. No. 5,611,882 (describing a water-based moldable composition made of cellulose fibres and soybean protein binder), and U.S. Pat. No. 5,729,936 (describing preparation of a prefabricated fibre-based core, to be combined in a next step by laminating with conventional wallboard). These five patents are incorporated herein by reference. These patents, however, do not disclose boards that offer an ideal combination of weight reduction, sufficient strength, and the ability to be produced in one manufacturing step.

U.S. Pat. No. 4,382,108 (incorporated herein by reference) describes production of a board with a core made from scrap plastic particles sandwiched between wood wafers and consolidated in one step by using polyisocianate resin binder. However, the core does not contain macro-voids, and is expected to be at least 50% heavier than an ordinary OSB panel of similar dimensions.

Accordingly, there is a need for an improved product and process that offers the combination of weight reduction, sufficient strength, and the ability to make the product in one pressing step which is preferable because it helps minimize production costs.

SUMMARY OF THE INVENTION

It is, therefore, an object of the present invention to provide an improved product and process whereby the above-noted drawbacks are obviated.

The present invention creates a 3-layer, sandwich-type structural panel with OSB faces and a light core inside, with the core preferably containing unfilled void space to provide an overall reduction in panel weight, while presenting sufficient resistance to compression during face consolidation in a conventional OSB press-cycle.

According to one aspect of the present invention a core is provided between first and second oriented strand faces made from wood flakes (wafers) mixed with a thermoset resin binder, wherein the core includes a perforated mat made in such a way that the perforation wall surfaces are essentially orthogonal to the orientation of the first and second oriented strand faces. In our experience, a sufficiently strong board can be made by completely replacing ordinary wood core with a mat containing between 0% and 75% of the void volume and made from a compression-resistant waste material of similar density and strength.

According to another aspect of the present invention a core is provided between first and second oriented strand faces that have a layer of wood flakes mixed with a thermoset resin binder, wherein the core consists of separate, essentially flat chunks of compression-resistant material of essentially the same thickness placed in one layer between faces so that the wood flakes on top and under the core bridge over the voids between the chunks.

According to another aspect of the present invention, a method for manufacturing an oriented strand board comprises the steps of depositing a first layer of wood flakes mixed with a thermoset resin binder, with a horizontal orientation; depositing a core layer of a perforated mat on the upper surface of the first layer of wood flakes so that the perforation wall surfaces are essentially orthogonal to the orientation of the first layer of wood flakes; depositing a second layer of wood flakes mixed with a thermoset resin binder on the upper surface of the core layer with the same horizontal orientation as that of the first layer of wood flakes; and applying heat and pressure to the layers in a single hot pressing step.

According to another aspect of the present invention, a method for manufacturing an oriented strand board comprises the steps of depositing a first layer of wood flakes mixed with a thermoset resin binder, with a horizontal orientation; depositing a core layer of separate, essentially flat chunks of compression-resistant material of essentially the same thickness placed in one layer between faces so that the wood flakes on top and under the core bridge over the voids between the chunks; depositing a second layer of wood flakes mixed with a thermoset resin binder on the upper surface of the core layer with the same horizontal orientation as that of the first layer of wood flakes; and applying heat and pressure to the layers in a single hot pressing step.

Other objects, features and advantages of the invention will become apparent from the following detailed description taken in conjunction with the accompanying drawings.

DESCRIPTION OF THE PREFERRED EMBODIMENTS

Figure 1:
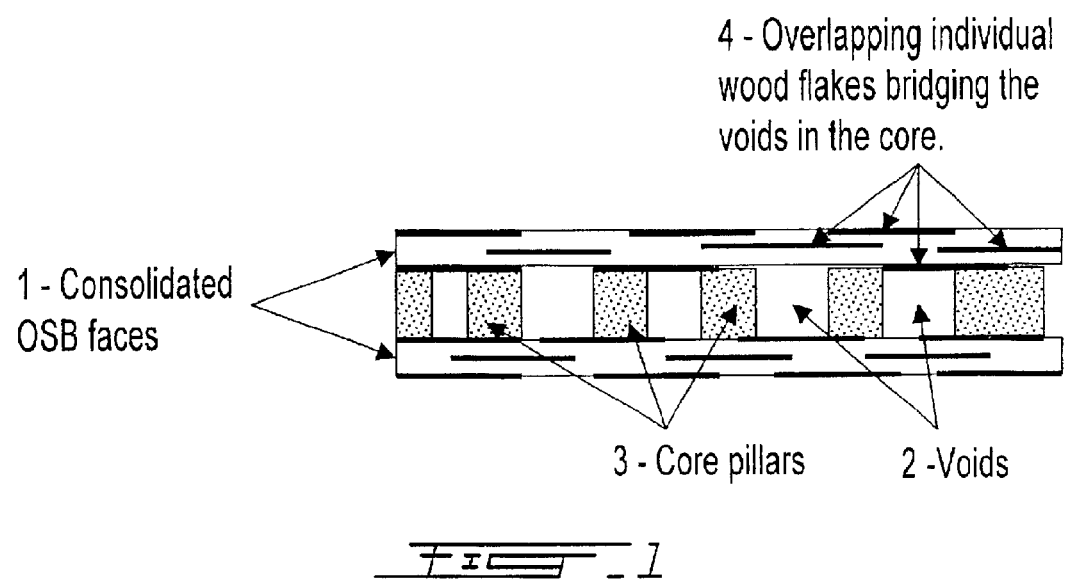
FIG. 1 is a schematic cross-section of a finished panel of the present invention.

In the present invention, it is necessary for the core to have sufficient resistance to compression to withstand the press cycle. As shown in FIG. 1, the material between the voids is formed as a solid pillar structure (3), so that it is capable of supporting the faces (1) during the press cycle, by orienting the void boundaries (2) essentially orthogonal to the face planes. This is achieved either by placing a continuous perforated mat or separate, individual chunks or pieces of compression-resistant material (e.g., regular wood chips) between the two layers of face material (4). It was discovered that both recycled cellulose fibre and papermaking sludge make excellent candidates for an OSB core substitute. Also, it was discovered that it is preferable to add resin binder to the paper mill sludge core. The amount of resin binder added to the core is preferably less than 10% by weight, and even more preferably between about 2% and 5% by weight. It has also been noted that the presence of inorganic filler (clay, calcium carbonate, titanium dioxide, etc.) in the sludge or recycled paper waste contributed to the resistance of the preformed core to compression in the OSB press. Therefore, having the inorganic filler content in the core feed between 10% and 80% by weight is preferred, with a range of about 20% to 60% by weight being more preferable.

According to the present invention, the core may be manufactured from paper-mill sludge, recycled paper, solid wood chunks (also known as chips in the pulp-making industry) and other suitable compression-resistant material of low intrinsic value, such as vulcanized rubber, thermoset plastics, volcanic rock, etc. The core may be made as a continuous mat perforated by a network of holes, or as a single layer of chunks or pellets of essentially equal height with empty spaces therebetween.

FIG. 1 represents both the embodiment of the present invention that uses a continuous perforated mat and the embodiment of the present invention that uses individual chunks (or pellets) of compression-resistant material. As shown in FIG. 1, both the holes (2) in the mat or individual chunks (3) in the discontinuous core are placed in such a way that the wood flakes (4), which constitute the faces (1), bridge the voids during pressing without any significant bending towards the opposite face before the compression stage.

The present invention also includes a novel process to produce such a layered panel by using conventional OSB manufacturing equipment (e.g., a forming line and a press). By this process the consolidation of loose wood flakes with the core material may occur in one step, as opposed to the multi-step laminating process that is used for making sandwich-type panels. The product, as shown in FIG. 1, is made by laying down a layer of loose face wafers, placing a core (perforated mat or individual pieces with voids in between) on top and finishing with another layer of loose face wafers. Then the assemblage is subjected to heat and pressure in a single hot pressing step.

In both embodiments (perforated mat or individual pieces) the acceptable range of voids by volume in the core preferably is between 0% and 75%, and, more preferably between 0% and 50%. Another requirement is that the wood flakes must also be able to bridge the voids in the perforated mat or the voids between the individual chunks. In the individual piece embodiment, the sizes of the individual chunks should be compatible with the size of the voids. Several factor should be considered in choosing the size of the chunks. For example, the chunks should match the required thickness of the core. Also, as noted above, a bridging requirement must be met. The chunks should be of such a size that the wood flakes are able to bridge the voids between the chunks. Moreover, since the chunks will need to be deposited by a distribution wheel (or equivalent), the chunks should be of such a size to facilitate laying the chunks down in one layer during the manufacturing process. In this regard, different distribution wheels have different limitations of size and shape. Therefore, if a distribution wheel is used, the chunks must also conform to the distribution wheel limitations.

EXAMPLE 1

Figure 2:
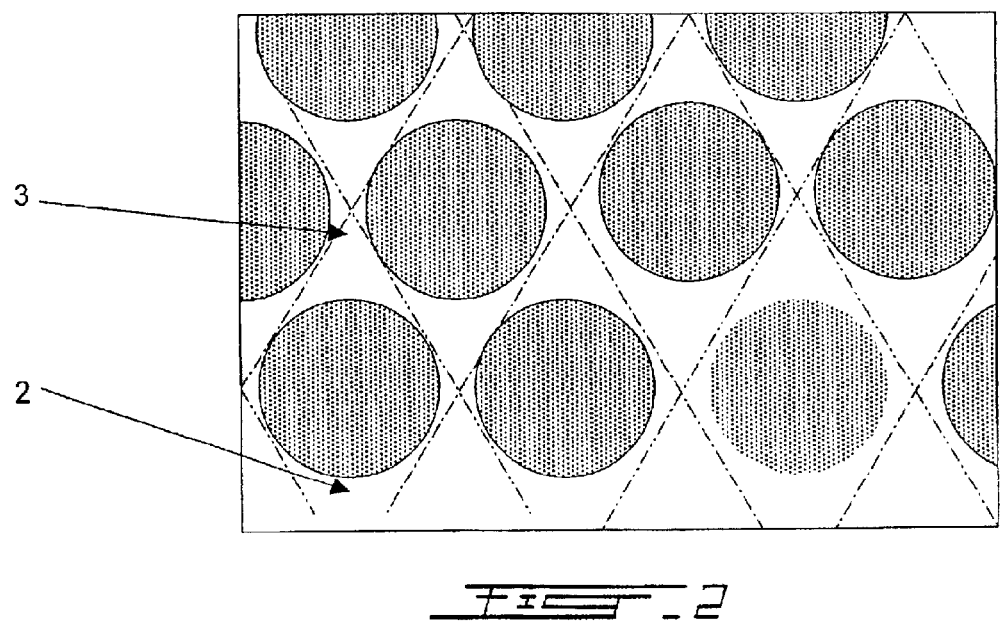
FIG. 2 shows an example of void distribution in the fiber mat core of the present invention.

Several continuous perforated fiber mats were made from the recycled mixed office waste (MOW) and primary papermaking sludge (PPS) (see FIG. 2 for the hole pattern in the core). The terms mixed office waste and primary papermaking sludge are well familiar to people involved in papermaking industry. In this case MOW was made by repulping of the used photocopy paper (which normally has roughly 80% cellulose fibres and 20% inorganic filler such as clay or calcium carbonate), while a sample of primary sludge was collected from the outlet of paper mill sludge press (that material consisted of a mix of 40% cellulose fibers and 60% of inorganic filler nearly equally split between calcium carbonate and clay). It should be noted, however, that the sludge composition is dependent on a particular plant product mix and should not be taken as a restriction on our product definition.

Example 1 describes 4 separate board preparations, 2 of them using 100% MOW material as a core the other 2 use 100% PPS material (see Table 1). Thirty-seven percent (37%) water solution of phenol-formaldehyde resin was sprayed on both sides of the core to add about 3% dry weight of the resin. The core samples (perforated mats with resin) were placed between two layers of face wafers that were blended with about 2.5% dry PF resin and pressed in a 20"×20" laboratory press. The face wafers that were used were aspen hardwood face wafers, which were obtained as a "grab" sample from the standard OSB production line. The conditions of pressing in the laboratory press were as follows: 200 seconds under 12 Mpa pressure and 215° C. temperature. The results are summarized in Table 1.

TABLE 1

Make-up and Properties of Composite Panels

| Sample | Control | MOW-1 | MOW-2 | PPS-1 | PPS-2 |
|---|---|---|---|---|---|
| Core | Wood flakes | Fiber mat | Fiber mat | Fiber mat | Fiber mat |
| Face amount (each side) | 425 g | 425 g | 500 g | 425 g | 500 g |
| Thickness | 0.420 | 0.412 | 0.419 | 0.450 | 0.413 |
| Density | 42 | 29.1 | 31.8 | 34.4 | 32.0 |
| Internal Bond | 60 | 11 | 16 | 25 | 25 |
| MOE | 601 | 241 | 316 | 304 | 289 |
| MOR | 3,380 | 1,095 | 1,454 | 1,564 | 1,330 |

MOW = Mixed Office Waste, PPS = Primary Papermaking Sludge
Pressure 12 Mpa, temperature 215° C., time under pressure 200 seconds By comparing the resulting products to an ordinary OSB panel (containing conventional wood flakes mixed with 2.5% PF resin for the core of the same thickness), it was found that some of our board samples retained close to ½ of the apparent internal bond, modulus of elasticity (MOE) and modulus of rupture (MOR) while using ⅓ less wood in its recipe. Note that these properties were obtained with nearly 40% of the core volume occupied by voids.

EXAMPLE 2

A continuous non-perforated fiber mat was made from recycled primary papermaking sludge (PPS) uniformly impregnated with PF resin solution to the levels of 3% and 5% dry resin by weight. The mats were dried without inducing resin polymerization. The core samples were placed between two layers of face wafers that were blended with 2.4% dry PF resin and pressed in a 20"×20" laboratory press. The same materials and conditions as in the first example were used.

The obtained properties are summarized in Table 2, demonstrating that the complete replacement of wood wafers by a recycled primary papermaking sludge that contained a small percentage of PF resin gives a panel with nearly normal strength and density, with a 30% reduction in wood consumption.

TABLE 2

Make-up and Properties of Composite Panels

| Sample | Control | PPS-3 | PPS-4 |
|---|---|---|---|
| Core | Wood flakes | Fiber mat | Fiber mat |
| % PF resin in the core | 2.4 | 3 | 5 |
| Face amount (each side) | 425 g | 498 g | 519 g |
| Thickness | 0.420 | 0.420 | 0.418 |
| Density | 42 | 37 | 37 |
| Internal Bond | 60 | 41 | 39 |
| MOE | 601 | 407 | 413 |
| MOR | 3,380 | 2,149 | 2,188 |

The core mat is made from primary paper making sludge containing PF resin. (The wood flakes, and other materials are of the same origin as in previous examples, so are the recipes for the control OSB panel and pressing conditions)

EXAMPLE 3

The panel was prepared by laying down a layer of face wafers, followed by a layer of evenly distributed square chunks made by cutting of the resin-impregnated primary papermaking sludge mat from previous example covered by another layer of conventional face wafers. The 1"×1"×¼" chunks contained 3% resin evenly distributed through their thickness and were laid out in a random fashion leaving 22% of evenly distributed void space between them. The face material contained 2.4% PF resin. All the other materials and conditions are the same as those in the two previous examples.

TABLE 3

Make-up and Properties of Composite Panels

| Sample | Control | PPS-6 |
|---|---|---|
| Core | Wood flakes | Chunks of PPS mat |
| Core amount | 425 g | 400 g |
| Face amount (each side) | 425 g | 425 g |
| Thickness | 0.420 | 0.425 |
| Density | 42 | 35.0 |
| Internal Bond | 60 | 35 |
| MOE | 601 | 427 |
| MOR | 3,380 | 2,091 |

The wood in the core was substituted with randomly distributed, 1" × 1" × ¼" flat chunks made by cutting of primary paper making sludge mat containing 3% PF resin. The core volume contained 20% void space between the chunks. Pressing conditions: 200 sec. Under 12 Mpa pressure and 215° C. temperature The properties obtained after pressing stage are shown in Table 3. As compared to a conventional board, 213 of the apparent strength values have been retained by the panel with a 12% reduction in weight and a 30% reduction in wood consumption. Again, the conventional OSB board is the same for all examples and is made from standard flakes sampled directly from an OSB production line, uses standard amounts of resin and standard conditions (i.e., the same conditions as were used for our board preparation tests).

EXAMPLE 4

The panel was prepared by laying down a layer of face wafers, followed by a layer of evenly distributed hardwood chips covered by another layer of conventional face wafers. The wood chips were screened to be between ¼" and ⅜" thick. About 2.5% PF resin was added to face wafers and 3% to core chips. The wood chips were sampled directly from a chip pile of a northern hardwood Kraft pulp mill. The rest of the materials and conditions are as described in the preceding examples.

The results of testing of the consolidated panels are given in Table 4. As compared to conventional board properties, a 25% weight reduction was achieved, while preserving up to ⅔ of major strength values. Again, just as in all the previous examples, it is an ordinary OSB panel of the same dimensions with conventional wood flakes in the core was used as a control,

TABLE 4

Properties of Composite Panels Using Wood Chips as a Core

| | Ingredients | | Properties of pressed panel | | | |
|---|---|---|---|---|---|---|
| Sample | Face wt per layer, g | Core wt., g | Thickness | Density | MOE | MOR |
| 1 | 425 | 180 | 0.414 | 24.2 | 395 | 1,292 |
| 2 | 550 | 180 | 0.430 | 29.1 | 341 | 1,776 |
| 3 | 425 | 425 | 0.431 | 29.9 | 443 | 2,161 |
| 4 | 500 | 190 | 0.421 | 31.4 | 378 | 2,083 |

CONCLUSION

The present invention can be practiced in other various forms without departing from the spirit and scope of the invention. In other words, the foregoing description of embodiments has been given for illustrative purposes only and is not to be construed as imposing any limitations in any respect. For example, various methods of recycled fiber mat preparation can be envisaged, such as, for example, spray drying of the paper machine sludge slurry mixed with PF resin and forming it on the conveyor belt using the so called air former, various methods of making voids (or perforations) in a fiber mat core can be applied, such as, for example cuffing the holes in the already formed wet or dry mat, or forming the mat by depositing a sludge slurry on top of the profiled or partially blinded filtration media so that the voids are formed during a dewatering step. Also, other recycled and low value materials could be used for the core, including those from agricultural waste or by-products.

The scope of the invention is, therefore, to be determined solely by the following claims and is not to be limited by the text of the specification. Accordingly, alterations that are made that are equivalent to the scope of the claims fall within the true spirit and scope of the invention.

We claim:

1. A single press OSB panel, the panel comprising:
   a first oriented strand face having a layer of wood flakes mixed with a thermoset resin binder, said first oriented strand face defining a plane;
   a second oriented stand face having a layer of wood flakes mixed with a thermoset resin binder; and
   a core material between said first oriented strand face and said second oriented strand face, said core material defining voids having boundaries that are essentially orthogonal to said plane defined by said first oriented strand face, said voids extending been said first and second oriented strand faces; and
   wherein said wood flakes have dimensions sufficient to bridge said voids.

2. The panel of claim 1, wherein said core material comprises a perforated mat comprising perforation boundaries essentially orthogonal to the plane defined by said first oriented strand face.

3. The panel of claim 1, wherein substantially all said voids have a diameter which is smaller than a diameter of substantially all said wood flakes.

4. The panel of claim 2, wherein said core material further comprises inorganic filler in the amount of about 10% to 80% by weight.

5. The panel of claim 4, wherein said inorganic filler comprises one or more of clay, calcium carbonate, and titanium dioxide.

6. The panel of claim 4, wherein said perforated mat comprises one or more of paper mill sludge, recycled paper, vulanized rubber, thermoset plastics, and volcanic rock.

7. The panel of claim 2, wherein said perforated mat is perforated such that it defines at most 75% voids by volume and wherein said core material further comprises resin binder in an amount of less than 10% by weight.

8. The panel of claim 2, wherein said perforated mat is perforated such that it defines at most 50% voids by volume and wherein said core material further comprises resin binder in an amount of less than 5% by weight.

9. The panel of claim 2, wherein said perforated mat consists essentially of paper mill sludge.

10. The panel according to claim 2, wherein said perforated mat consists essentially of recycled paper.

11. The panel according to claim 2, wherein said perforated mat consists essentially of vulcanized rubber.

12. The panel according to claim 2, wherein said perforated mat consists essentially of thermoset plastics.

13. The panel according to claim 1, wherein said core comprises a plurality of individual chunks of compression-resistant material that are so oriented that voids between adjacent chunks have boundaries that are in a direction essentially orthogonal to said plane defined by said first oriented strand face.

14. The panel according to claim 13, wherein said core further comprises inorganic filler in the amount of 10% to 80% by weight.

15. The panel according to claim 14, wherein said inorganic filler comprises one or more of clay, calcium carbonate, and titanium dioxide.

16. The panel according to claim 13, wherein said core comprises between 0% and 75% voids by volume and wherein said core further comprises resin hinder in an amount of less than 10% by weight.

17. The panel according to claim 16, wherein said compression resistant material comprises one or more of paper mill sludge, wood chips, recycled paper, vulcanized rubber, thermoset plastics, and volcanic rock.

18. The panel according to claim 13, wherein said core comprises between 0% and 50% voids by volume and wherein said core further comprises resin binder in an amount of less than 5% by weight.

19. The panel according to claim 13, wherein said compression-resistant material consists essentially of paper mill sludge.

20. The panel according to claim 13, wherein said compression-resistant material consists essentially of wood chips.

21. The panel according to claim 13, wherein said compression-resistant material consists essentially of recycled paper.

22. The panel according to claim 13, wherein said compression-resistant material consists essentially of vulcanized rubber.

23. The panel according to claim 13, wherein said compression-resistant material consists essentially of thermoset plastics.

24. The panel according to claim 13, wherein said compression-resistant material consists essentially of volcanic rock.

* * * * *